United States Patent Office 3,039,850
Patented June 19, 1962

3,039,850
PROCESS FOR THE PRODUCTION OF ANHYDROUS HYDROGEN FLUORIDE
Domenico Zanon and Roberto Trupiano, Milan, Italy, assignors to I.C.P.M. S.p.A. Industrie Chimiche Porto Marghera, Milan, Italy, a company of Italy
No Drawing. Filed Nov. 12, 1959, Ser. No. 852,213
Claims priority, application Italy Nov. 17, 1958
1 Claim. (Cl. 23—153)

This invention relates to a process for the production of anhydrous hydrogen fluoride.

It is an object of the present invention to produce anhydrous, pure hydrogen fluoride, virtually free of sulphur dioxide.

A further object of the present invention is to provide a process whereby the sulphur dioxide is removed from hydrogen fluoride by oxidation which converts sulphur dioxide into sulphuric acid, thus making it possible to remove the sulphur dioxide fraction by subsequent distillation of the impure hydrogen fluoride.

Still another object of the present invention is to provide a process for producing hydrogen fluoride of such a purity as to be capable of being employed in alkylation processes, in the production of fluorinated hydrocarbons and, in general, in all the chemical processes in which the use of highly pure hydrogen fluoride is an imperative requirement.

It is known, in fact, that commercial hydrogen fluoride contains a number of impurities: these latter are generally formed by sulphuric acid, water, fluosilicic acid and sulphur dioxide.

Water and sulphuric acid have boiling points which are higher than the boiling point of hydrogen fluoride, so that they can be relatively easily separated from hydrogen fluoride by distillation and removed among the tail products of the distillation process.

According to the selected distillation temperature, fluosilicic acid can be decomposed into hydrogen fluoride and silicon tetrafluoride: this latter cannot be condensed and is removed, by distillation, by discharging it from the vent openings provided in the condenser.

Sulphur dioxide, conversely, which has a boiling point lower than that of hydrogen fluoride, is distilled concurrently therewith and thus contamination of hydrogen fluoride takes place, with the attendant disadvantage that the presence of sulphur dioxide is such as to energetically promote the corrosion of the metallic parts of the installation.

It has been recalled above that sulphur dioxide, even in the slightest traces, is an impurity which cannot be tolerated for hydrogen fluoride intended to be used in alkylation processes and in processes for the production of fluorinated hydrocarbons, to cite only a few examples.

The process according to the present invention has for its aim that of doing away with the shortcomings and disadvantages which are inherent to the commercial aqueous hydrogen fluoride.

Briefly stated, the process of the present invention is a two-stage process whereby the sulphur dioxide present in the impure hydrogen fluoride is oxidised, before subjecting hydrogen fluoride to distillation, by hydrogen peroxide to convert sulphur dioxide into sulphuric acid, after which the thusly formed sulphuric acid is removed during progress of the subsequent distillation which also removes the water and the sulphuric acid aliquot initially present in the impure, commercial aqueous hydrogen fluoride.

The process of the present invention can be applied, in order to obtain anhydrous hydrogen fluoride, either to concentrated commercial hydrogen fluoride, containing 96–97% by weight of HF, or to diluted commercial hydrogen fluoride, containing 70–80% by weight of HF.

The distillate obtained by the process of the present invention has a minimum HF grade of 99.85%, a water contents less than 0.1% and a sulphur dioxide contents less than 0.002%.

According to a preferred embodiment of the present invention, the process for obtaining hydrogen fluoride of high purity comprises the steps of oxidising the sulphur dioxide contained in the impure hydrogen fluoride to convert $SO_2$ into sulphuric acid and distilling off the resultant sulphuric acid together with the other impurities which contaminate hydrogen fluoride.

The oxidation stage can take place either according to a continuous or a discontinuous run, depending upon the time required for oxidising sulphur dioxide.

If the continuous run is selected, the impure, commercial aqueous hydrogen fluoride is fed to a fluid-tight reactor, internally coated with a corrosion-resistant material and equipped with a stirrer, wherein said impure hydrogen fluoride is admixed with hydrogen peroxide. A hydrogen peroxide aqueous solution is used for performing this process. Hydrogen fluoride (aqueous) and the hydrogen peroxide solution are continually fed to the reactor, the rates of flow of the two reactants being controlled by rotary flow-meters. The admixture of hydrogen fluoride with hydrogen peroxide entails a dilution of the former, and the solution heat, which is very high if, for example, 98% hydrogen fluoride is used, causes both the temperature and the pressure within the reactor to rise. The concentration of hydrogen peroxide in the aqueous solution thereof is adjusted as a function of the temperature at which it is desired to perform the process. This temperature can be varied widely within the range 20° C.–100° C., according to the concentration of the hydrogen fluoride being treated and to its sulphur dioxide contents. If the solution heat is not sufficient, supplemental heat can be administered to the reactor from outside.

From the reactor described above, the hydrogen fluoride is passed into a second mixer-reactor quite similar to the first described one: additional hydrogen peroxide solution can be fed to said second reactor, if necessary. This second mixer-reactor acts as a conditioning apparatus. The hydrogen fluoride may stand in the first and the second of these reactors for a time variable from 1 to 8 hours.

The second reactor or mixer is kept at the same pressure as the first one and the hydrogen fluoride virtually free from sulphur dioxide is sent from said second reactor to a distillation column, care being taken to keep the inside of the second reactor under positive pressure.

The process according to the present invention can also be carried out according to a discontinuous procedure, that is, by charging the reactors or mixers with hydrogen fluoride and aqueous hydrogen peroxide according to preselected ratios, and effecting the conditioning stage until all the present sulphur dioxide has been oxidised.

On completion of the conditioning stage, the sulphur dioxide free hydrogen fluoride is sent to the distillation column.

The distillation stage can take place continuously, even if the oxidation stage is discontinuously carried out: as a matter of fact, provision can be made for having the column fed by either reactor or mixer, by adjusting the feeding time of the column equal to the time necessary for filling either reactor and performing the conditioning stage therein.

The high-boiling impurities are removed with the tail fractions: these may contain from 50% to 80% by weight of hydrogen fluoride according to the mode of distillation and to the production requirements.

The amount and concentration of hydrogen peroxide are adjusted consistently with the amount of sulphur dioxide to be oxidised and with the period of time intended for the process: instead of employing strictly stoichiometric amounts of hydrogen peroxide, excess quantities of this oxidising agent can also be employed.

The most conspicuous advantages afforded by the use of hydrogen peroxide with respect to other oxidising agents are that the process for producing hydrogen fluoride can be performed in a continuous run, due to the convenient dosage which is possible to effect with hydrogen peroxide, and that no metallic residue is left in the hydrogen fluoride or in the tail products, either. Another advantage consists in the fact that the number of impurities is not increased, but rather diminished from a qualitative standpoint, since sulphuric acid is formed in the process according to the invention, and sulphuric acid is an impurity which is normally present in commercial hydrogen fluoride wherefrom it can be subsequently removed by distillation as has been explained hereinbefore.

According to an alternative embodiment of the present invention gaseous hydrogen fluoride (impure) can be reacted with hydrogen peroxide by employing a number of different techniques: it can, for example, be bubbled through a hydrogen peroxide solution, injected under pressure in hydrogen peroxide or scrubbing gaseous impure hydrogen fluoride with aqueous solutions of hydrogen peroxide, and by other methods.

Sulphur dioxide could also be removed from hydrogen fluoride in a conventional distillation plant, provided that it is oxidised to sulphuric acid according to the present invention: in this case the oxidised sulphur dioxide is removed together with the sulphuric acid present as an original impurity. Thus, the operation of the distillation plant is simplified and rendered more versatile and the component part of the distillation plant may be made of ordinary steel.

According to a further modified embodiment of the present invention, a fraction of sulphur dioxide may be removed by oxidation with hydrogen peroxide and the remainder of the sulphur dioxide may be removed by degassing: in this case the oxidation with hydrogen peroxide is effected at atmospheric pressure so that, due to the effect of the reaction heat and of the dilution of the hydrogen fluoride solution by the hydrogen peroxide, the liquid phase of the system is allowed to attain the boiling point and the non-oxidised aliquot of sulphur dioxide can be removed by degassing.

For example, during the admixture of hydrogen peroxide to the impure hydrogen fluoride solution, the solution heat brings the liquid system to a boil and thus, concurrently with the oxidation of sulphur dioxide, the evaporation of the unreacted sulphur dioxide takes place and such unreacted sulphur dioxide can be exhausted from the system, e.g. through a vent hole provided to this end on top of the mixer. This vent hole may be connected to a condenser, the operation of which is adjusted so that condensation of hydrogen fluoride may take place, whereas the uncondensed sulphur dioxide is removed still in gaseous form. By so doing, important savings of hydrogen peroxide can be obtained.

The invention is illustrated but not limited by the following examples.

*Example 1*

A reactor, equipped with stirrer and overflow discharge outlet is continuously fed with 100 kgs. per hr. of a 98.7% solution of hydrogen fluoride containing 0.4% sulphur dioxide.

Hydrogen fluoride is admixed, at the same time, with 0.78 kg. per hr. of 30% hydrogen peroxide, a 10% excess with respect to the theoretical amount necessary for oxidising sulphur dioxide to sulphuric acid according to the equation $$SO_2 + H_2O_2 \rightarrow H_2SO_4$$

This particular reaction permits to convert a low-boiling compound such as sulphur dioxide, into a high-boiling compound such as sulphuric acid and thus the purification of hydrogen fluoride by distillation is made possible.

If the reaction heat, and that due to the solution of the acid into the aqueous fraction of hydrogen peroxide are not sufficient to bring the temperature within the reactor to 60° C., the reactor, which is a fluid-tight reactor, can be heated from the outside, the resultant solution is now subjected to continuous distillation and the final distillate analyses:

|  | Percent |
|---|---|
| HF | 99.9 |
| $SO_2$ | 0.0005 |
| $H_2O$ | 0.09 |

*Example 2*

Eighty (80) kgs. of 98.7% aqueous hydrogen fluoride containing 0.4% sulphur dioxide are admixed during 4 hrs. in a reactor equipped with stirrer and an outlet port in the lowermost portion of the vessel, with 0.62 kg. of 30% hydrogen peroxide, that is, an excess of 10% with respect to the theoretical amount necessary for oxidising sulphuric dioxide to sulphuric acid.

The reaction is just the same indicated in the Example 1 and, if the reaction and solution heats are insufficient to bring the temperature within the reactor to 60° C., the reactor is heated from outside. The resultant solution is then subjected to distillation and the final distillate has the following analytical composition:

|  | Percent |
|---|---|
| HF | 99.9 |
| $SO_2$ | 0.0005 |
| $H_2O$ | 0.09 |

*Example 3*

A tray distillation column, 6 metre-high, is fed with 450 kgs. per hour of 97% aqueous hydrogen fluoride containing 0.65% of sulphur dioxide.

In correspondence with the middle point of the column there are fed 6 kgs. per hour of 30% hydrogen peroxide, that is, an amount in excess by 15% with respect to theory. On the feeding tray the temperature of the mixture raises to 60° C. approximately.

The oxidation process runs in very much the same way as has been outlined in Example 1 and the sulphur dioxide is converted into sulphuric acid.

The final distillate has the following composition:

|  | Percent |
|---|---|
| HF | 99.9 |
| $SO_2$ | 0.0005 |
| $H_2O$ | 0.09 |

*Example 4*

Ninety (90) kgs. of 98% aqueous hydrogen fluoride containing 0.5% sulphur dioxide are admixed during 4 hrs. in a reactor equipped with stirrer and outlet in the lowermost part of the vessel, with 0.96 kg. of 15% hydrogen peroxide, so as to oxidise the 60% of the present sulphur dioxide.

The oxidation reaction is always the same, the reaction and the solution heats cause the temperature of the reaction mixture to rise by 20° C. and thus permits degassing or venting out the sulphur dioxide aliquot which has not been oxidised by the hydrogen peroxide. The unreacted $SO_2$ is vented out of the reactor through a vent hole provided therein.

The solution is then distilled and the final distillate has the following analytical composition:

|  | Percent |
|---|---|
| HF | 99.9 |
| $SO_2$ | 0.0005 |
| $H_2O$ | 0.09 |

We claim:

In the process for eliminating at least the major portion of sulphur dioxide from impure hydrogen fluoride by oxidizing said sulphur dioxide, the improvement consisting in the employment of hydrogen peroxide as the oxidizing agent and including the steps of (1) admixing the impure hydrogen fluoride with hydrogen peroxide to oxidize the sulphur dioxide and to convert said major portion of sulphur dioxide into sulphuric acid, the amount of hydrogen peroxide used being in excess of the theoretical amount necessary for oxidizing the sulphur dioxide to sulphuric acid, and (2) distilling the mixture to obtain hydrogen fluoride free from the resulting sulphuric acid.

References Cited in the file of this patent
UNITED STATES PATENTS 2,777,754     Weinmayr _____ Jan. 15, 1957

OTHER REFERENCES

Thorpe's "Dictionary of Applied Chemistry," vol. 6, 1943, 4th edition, page 344. Longmans, Green & Co., N.Y.

Mellor: "A Comprehensive Treatise on Inorg. and Theo. Chem.," vol. 1, 1922 edition, page 941, Longmans, Green and Co., N.Y.